G. H. COWGILL.
REEL.
APPLICATION FILED SEPT. 1, 1910.
1,013,588.
Patented Jan. 2, 1912.
2 SHEETS—SHEET 1.
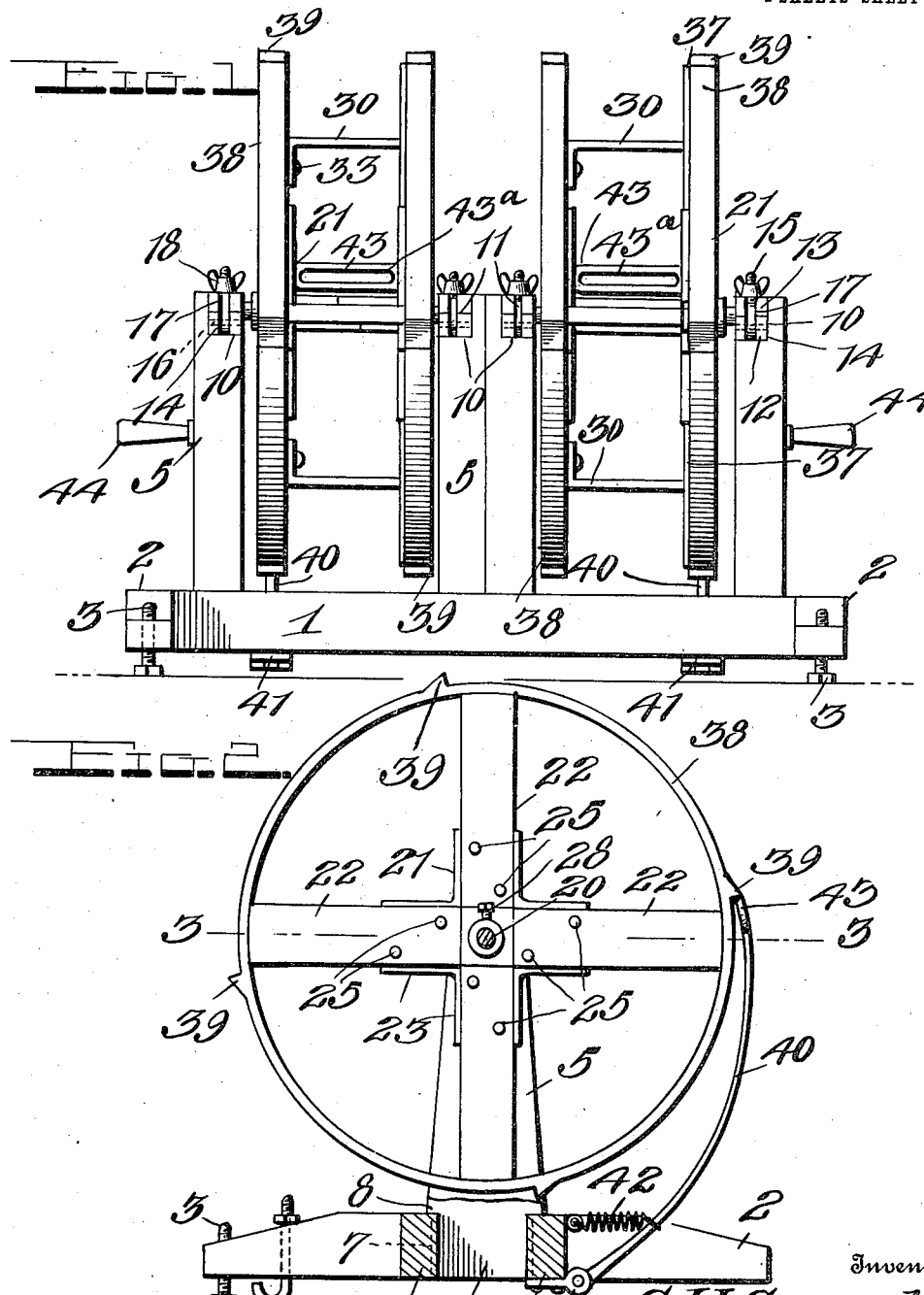
Witnesses
Chas. L. Grieshauer.
M. F. Reaer.
Inventor
G. H. Cowgill,
By Watson E. Coleman.
Attorney G. H. COWGILL.
REEL.
APPLICATION FILED SEPT. 1, 1910.
1,013,588.
Patented Jan. 2, 1912.
2 SHEETS—SHEET 2.
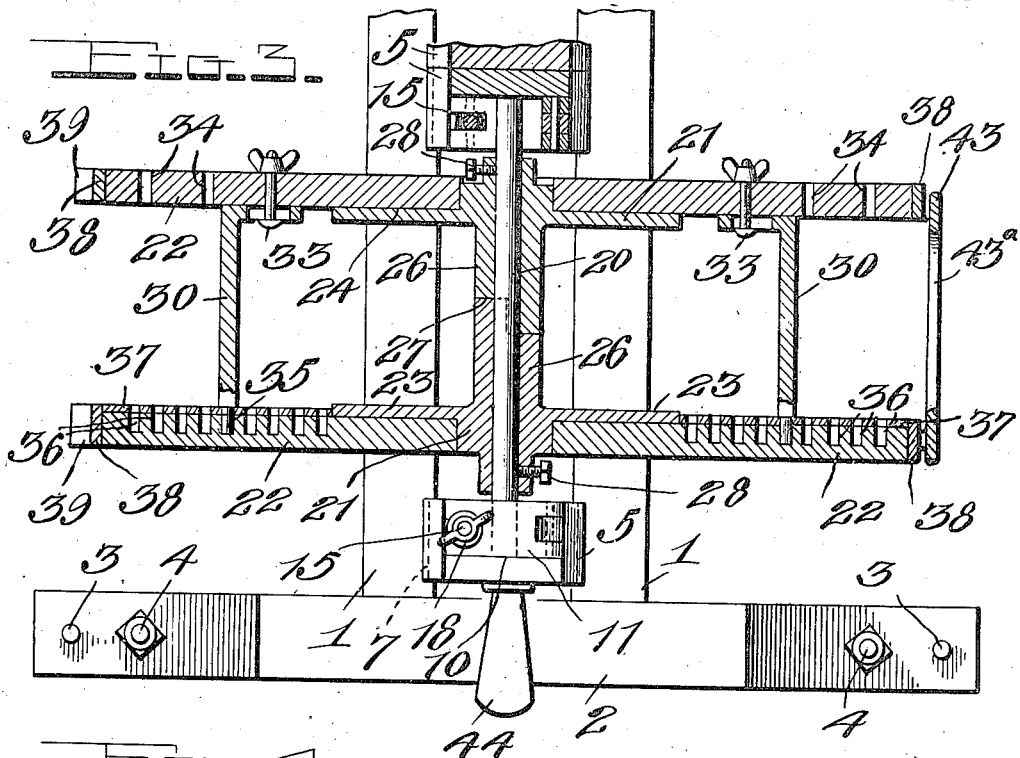
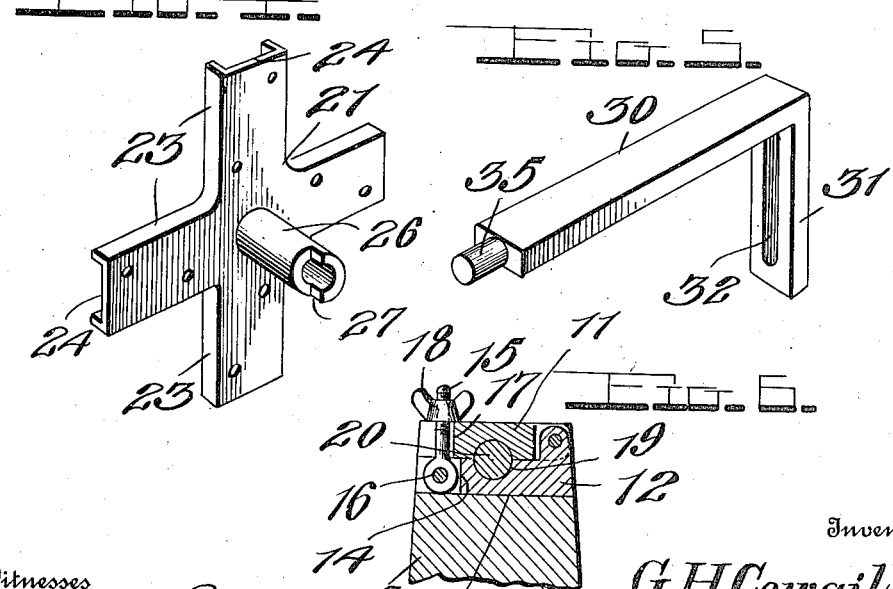
Witnesses
Chas. L. Griesbauer.
M. F. Reeder.
Inventor
G. H. Cowgill,
By Watson E. Coleman.
Attorney

UNITED STATES PATENT OFFICE.

GUY H. COWGILL, OF HERMITAGE, TENNESSEE.

REEL.

1,013,588. Specification of Letters Patent. Patented Jan. 2, 1912.

Application filed September 1, 1910. Serial No. 580,069.

*To all whom it may concern:*

Be it known that I, GUY H. COWGILL, a citizen of the United States, residing at Hermitage, in the county of Davidson and State of Tennessee, have invented certain new and useful Improvements in Reels, of which the following is a specification, reference being had to the accompanying drawings.

This invention relates to improvements in reels of that class employed for carrying and paying out or winding coils of wire such as are employed for fencing and for bale tying purposes.

One object of my invention is to effect improvements in the construction of the frame in which the reel or spool element is mounted.

Another object is to provide improved bearings for the shaft of the reel or spool element, which bearings admit of the reel being readily mounted therein, or dismounted therefrom.

Another object is to effect improvements in the construction of the heads of the reel or spool element.

Another object is to effect improvements in the construction of the reel, whereby the heads thereof are enabled to be detached from each other, and also from the supporting shaft or axle, to enable a coil to be placed on or removed from the reel.

Another object is to effect improvements in the construction of the reel heads and in the construction of the cross bars or wire supporting devices which connect the reel heads so that the said cross bars may be adjusted radially toward or from the center of the reel as may be required by the interior diameter of the wire coil to be mounted on the reel.

Another object of my invention is to provide improved means to prevent casual rotation of the reel.

With the above and other objects in view, my invention consists in the construction, combination and arrangement of devices hereinafter described and claimed.

In the accompanying drawings—Figure 1 is a side elevation of a reel constructed in accordance with my invention. Fig. 2 is partly an end elevation and partly a transverse sectional view of the same. Fig. 3 is a detail horizontal sectional view on a larger scale, and on the plane indicated by the line 3—3 of Fig. 2. Fig. 4 is a detail perspective view of the hub, central or spider member of one of the reel heads, also showing the inner portions of the spokes connected thereto. Fig. 5 is a detail perspective view of one of the cross bars which connect the heads of the reel together. Fig. 6 is a detail sectional view of one of the reel bearings.

I will first describe the frame in which my improved reel is mounted. A pair of longitudinally disposed spaced bars 1 have their ends secured in the rabbets in the transversely disposed end pieces 2. Supporting and adjusting screws 3 enter the end pieces from the under sides and near the ends thereof and form supports for the reel frame and may be adjusted as may be required to support the frame in a level position on uneven ground. The said end pieces are also each provided at one end with a hook bolt 4 for use in securing the reel frame on a baling press in the event that it is desired to use the reel in connection with a baling press. The bars 1 may be of any suitable length according to the number of reels to be mounted on the frame. For the purposes of this specification, the bars are shown as of sufficient length to enable two reels to be mounted on the frame.

In connection with the bars 1, I employ as many pairs of vertical standards 5 as may be required to carry the reels. Each standard has a tenon 6 formed at its lower end adapted to engage vertical rabbets 7 in the opposing sides of the bars 1, and providing shoulders 8 to bear on said bars. Suitable bolts, screws or other suitable fastening devices extend through the bars 1 and the said tenons and hence secure the standards firmly in place on the said bars 1. The inner members of the pairs of standards are in mutual contact as shown and each standard is provided on its inner side at its upper end with a recess 10. A bearing block 11 is employed in connection with each standard, each bearing block comprising a base section 12, and an upper section 13, one end of which is pivotally connected to one end of the base section, so that the upper section may be disposed on the base section or open upwardly and outwardly therefrom. The base section is provided at the end opposite that to which the upper section is pivotally connected with a vertical recess 14 in which is disposed the lower end of a bolt 15, which bolt is mounted on a pivot 16 so that it may swing in a vertical plane. The free end of the upper section 13 has a recess 17 for the reception of the bolt 15, and the latter has a winged nut 18 which may be adjusted to bear on the free end of the upper section 13 so as to lock the latter in closed position on the base section 12. The depth of the recess 10 is such that when the section 13 is closed, its upper side is flush or substantially so, with the upper end of the standard. A bearing opening 19 extends transversely through the bearing block 11 and is formed with one half in the base section and the other half in the hinged or pivoted section 13. The bearing blocks are for the reception of the ends of the shafts 20 on which the reels are mounted and owing to the provision of the hinged or pivoted upper sections of the bearings, it will be understood that the reel shafts with the reels thereon may be readily mounted on the bearings or detached therefrom. As hereinbefore indicated, any desired number of the reels may be employed in connection with the frame. For the purposes of this specification two of the reels are shown as thus mounted. Both the reels are alike in construction, and hence I will describe only one of them. The heads of the reel comprise a central, hub or spider member 21 and reel arms or spokes 22. The arms 23 of the spider members are radial and are provided in their outer sides with radial recesses 24 for the reception of the inner ends of the spokes or arms 22, said spokes or arms being secured by means of bolts 25. Each reel has a hub sleeve 26 extending outwardly therefrom, and also extending inwardly therefrom, and the inner ends of the said hub sleeves are recessed longitudinally on opposite sides so as to form an overlapping joint 27 between them. The shaft passes through the said hub sleeves and the latter are secured to the shaft independently of each other by means of set screws 28 or other suitable devices, and hence both the heads are detachably mounted on the shafts, and either head may be disconnected from the other and from the shaft as will be understood.

The cross bars 30 on which the wire coils are disposed are each provided at one end with a radial inwardly extending angle arm 31, which bears against the inner side of one of the spokes or arms of one of the heads, and is provided with a slot 32 for the reception of a bolt 33 which may be placed in any one of a number of adjusting openings 34 with which the said arm or support is provided. Hence the said cross bars are adjustably connected to the spokes or arms of one of the reel heads, and may be adjusted radially and disposed at any desired distance from the center of the reel, according to the inner diameter of the coil or bundle of wire to be mounted on the reel. The outer end of each cross bar 30 is formed with a stud 35 which may be inserted in any one of a radial series of openings 36 with which the arms or spokes of the other reel head are provided. The last mentioned reel arms or spokes are provided on their inner sides with iron or other suitable metallic reinforcing strips 37 which are provided with openings coincident with those in the said arms or spokes, the said reinforcing strips serving, as will be understood, to prevent wear of the said arms or spokes. Annular rims 38 are secured on the outer sides of the spokes of the respective heads of the reel at the outer ends of said spokes and one of the rims is provided with a suitable number of peripheral stops 39.

To prevent casual rotation of the reels I provide in connection with each of them a brake device which I will now describe. A curved arm 40 is hinged at its lower end to a plate 41 which may be secured by means of screws or other suitable devices, to the under side of one of the bars 1 of the reel frame. A coil spring 42 has one end connected to the upper side of the said bar and the other end connected to the said arm 40 and serves to normally draw the said arm to the said rim and keep it pressed against the periphery thereof, so that one of the stops 39 by engagement with the said arm will prevent the reel from rotating. The said arm 40 has at its free end a stop bar 43 which extends laterally therefrom, and across the periphery of the rim which is provided with the stops 39, and the said stop bar is also long enough to extend entirely across the reel from one head thereof to the other. The wire paid out or unreeled from the reel passes through a slot 43ª in the said stop bar and hence when the wire is under tension it moves the arm 40 outwardly against the tension of the spring 42, so as to dispose the stop bar 43 without the path of the stops 39, and permit the reel to be freely rotated. When the wire is slack and exerts no tension on the stop bar 43, the spring 42 moves the arm 40 inwardly so as to engage the stop bar 43 with one of the stops 39, and hence prevent the reel from casually turning. The standards 5 are provided with outwardly extending handles 44 which are used for moving the reel from place to place.

Inasmuch as the reel is detachably mounted in its supporting bearings and also comprises a pair of detachably connected heads one of which has the cross bars 30 or wire coil supporting devices, it will be understood that a wire coil may readily be mounted upon or removed from the reel.

I claim:—

The herein described reel comprising a pair of spiders each having radial arms provided with longitudinal channels on their inner sides, the said spiders being further provided with sleeve hub members detachably connected together, a common axle shaft extending through said sleeve hub members, means securing the sleeve hub members to the shaft, reel arms having their inner ends secured in the channels of the spider arms, the reel arms of one of the heads having a series of openings, and cross bars each having one end disposed in one of said openings, and provided at the opposite end with a right angled arm detachably and adjustably connected to one of the reel arms of the other head.

In testimony whereof I hereunto affix my signature in the presence of two witnesses.

GUY H. COWGILL.

Witnesses:
 CECIL HARPER,
 DORSEY CORLEY.